May 30, 1944.  B. M. HYMAN  2,349,905
HARVESTER CONSTRUCTION
Filed July 14, 1941   2 Sheets-Sheet 1
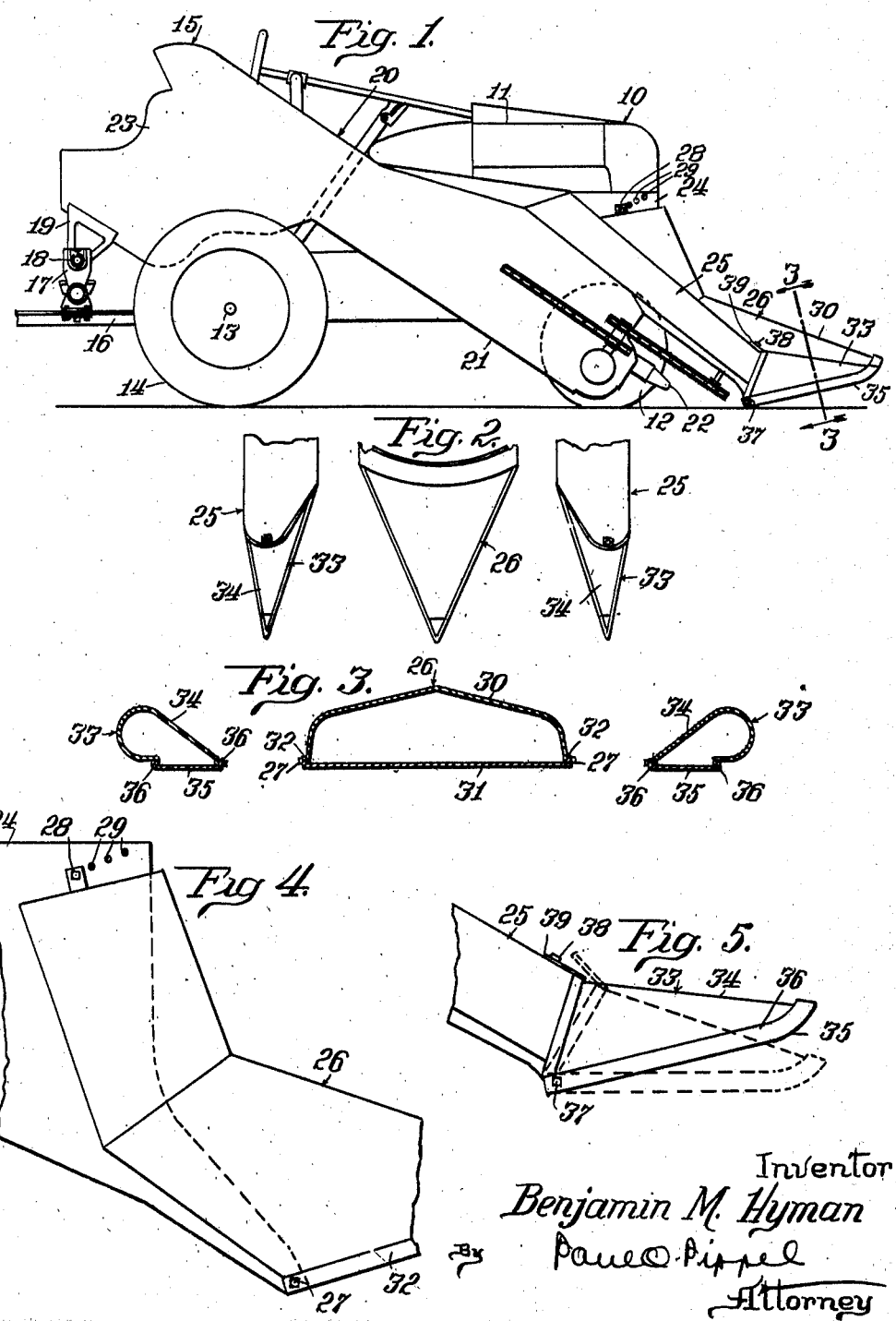
Inventor
Benjamin M. Hyman
By Paul O. Pippel
Attorney May 30, 1944.  B. M. HYMAN  2,349,905
HARVESTER CONSTRUCTION
Filed July 14, 1941  2 Sheets-Sheet 2
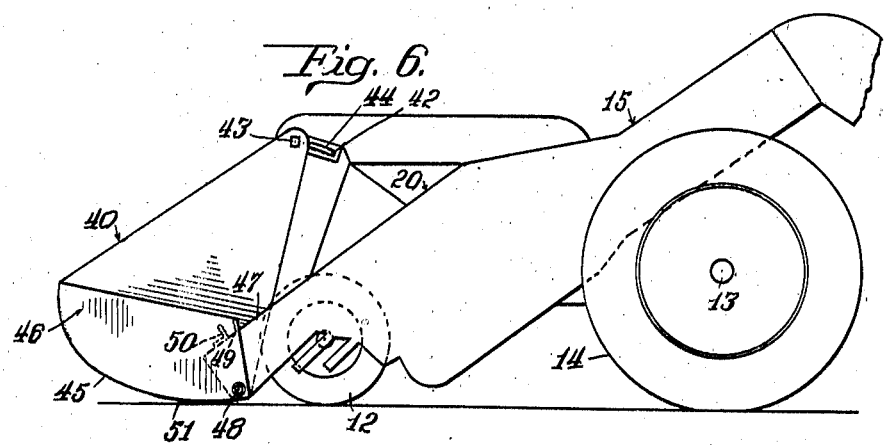
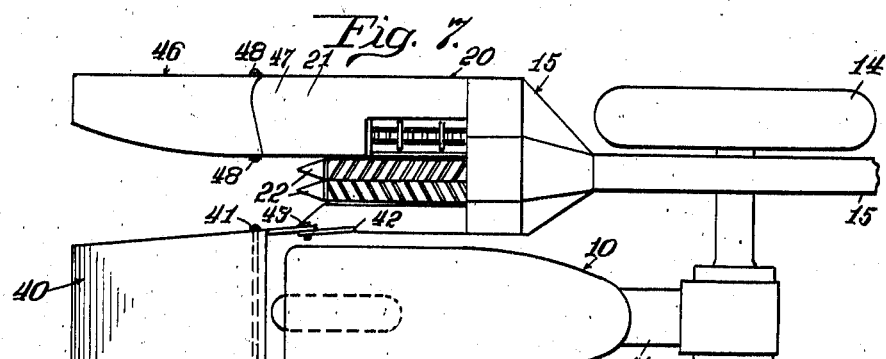
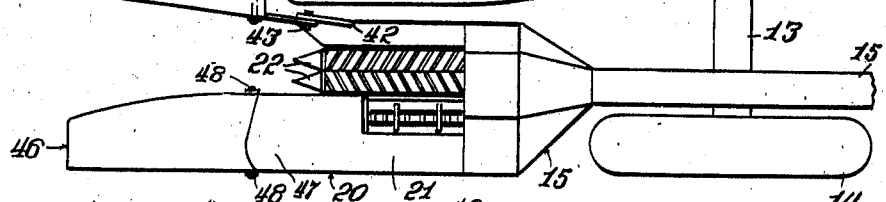
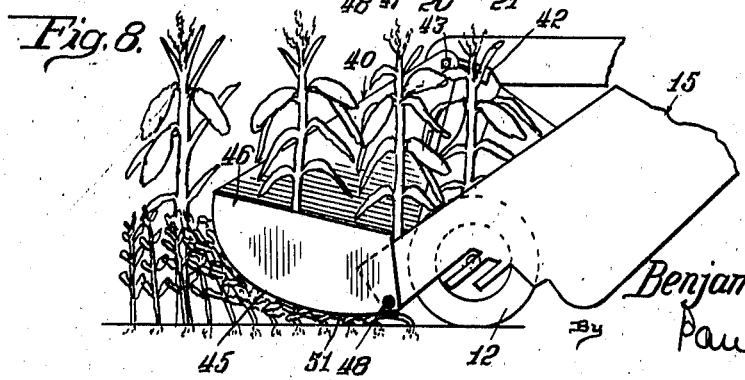
Inventor
Benjamin M. Hyman
By Paul O. Pippel
Attorney Patented May 30, 1944

2,349,905

UNITED STATES PATENT OFFICE 2,349,905

HARVESTER CONSTRUCTION

Benjamin M. Hyman, Moline, Ill., assignor to International Harvester Company, a corporation of New Jersey Application July 14, 1941, Serial No. 402,307

1 Claim. (Cl. 56—119)

This invention relates to a harvester construction. More specifically, it relates to a construction which prevents extraneous plant growth in and around the crops to be harvested from coming into contact with the harvesting mechanism itself.

Under certain conditions soy beans may be growing in and around corn. The result is that, when the corn stalks are stripped by snapping rolls, the soy bean plants may become entangled with the snapping rolls.

An object of the present invention is to provide an improved harvester construction.

A further object of the invention is the provision of means for preventing extraneous plant growth in and around crops to be harvested from entering or coming into contact with the mechanism which harvests the crops.

Another object is to provide means in association with a harvester for deflecting extraneous plant growth from the path of mechanism adapted to harvest crops around which the extraneous plant growth is located.

Still another object is the provision of deflecting means for preventing soy beans growing adjacent corn stalks from becoming entangled with snapping rolls of a harvester which snap ears from the corn stalks.

According to the present invention corn harvester units, which comprise spaced pairs of snapping rolls, are provided with deflecting means adjacent the forward ends of the rolls. These means include under surfaces sloping upwardly in a forward direction, which act to deflect extraneous plant growth, such as soy beans, growing in and around corn. The deflecting means may be provided in the form of the aforementioned upwardly sloping surfaces as part of conventional divider points on a corn picker.

In the drawings—

Figure 1 is a side view of a tractor with a corn picker mounted thereon including one form of the novel deflecting means of the present invention;

Figure 2 is a plan view of the very forward end of the picker of Figure 1, showing the deflecting means;

Figure 3 is a sectional view taken on the line 3—3 of Figure 1;

Figures 4 and 5 are detail views showing the manner of attachment of the novel deflecting means;

Figure 6 is a side view of a tractor and corn picker provided with a novel deflecting means of a modified form;

Figure 7 is a plan view of the tractor and picker shown in Figure 6; and,

Figure 8 is a side view of a portion of the picker and deflecting means shown in Figure 6 in operation in corn stalks around which soy beans are planted.

Referring to Figure 1, a tractor 10 is shown which includes a narrow body 11, a narrow front truck 12, a rear axle 13, and rear wheels 14. A corn picker 15 is shown mounted on the tractor which may be of the type shown in the copending applications of Benjamin M. Hyman et al., Serial No. 210,464, filed May 27, 1938, which became Patent No. 2,255,168 on September 9, 1941, and Benjamin M. Hyman, Serial No. 407,538, filed August 20, 1941, which became Patent No. 2,320,135 on May 25, 1943. The rear end of the picker is mounted in the manner shown in the said last-mentioned application, although this is not essential since the mounting itself forms no part of the present invention. As shown in Figure 1, the tractor is provided with a rearwardly extending draw-bar 16 upon which is mounted a bracket structure 17 which pivotally carries at 18 brackets 19, of which only one is shown, secured to the rear end of the picker 15. With this arrangement the picker is pivoted with respect to the tractor about an axis at 18. The picker includes units 20 at each side of the tractor, although only one unit is shown in Figure 1, since the tractor and the one unit obscure the other unit.

The picker unit 20 comprises a snapping unit 21 including snapping rolls 22, of which only one is shown, and a husking unit 23. The snapping unit 21 further includes a shield composed of a sheet metal member 24 partially surrounding the tractor body 10, and also shields 25 formed of sheet metal and positioned outside of the snapping rolls 22.

As seen in Figure 4, a divider member 26, formed of sheet metal and having a generally conical point, is connected at its lower end at 27 to the lower end of the member 24, and at its upper end by a bolt 28 secured in any one of a number of holes 29. The divider 26 comprises a main sheet metal member 30 which forms the conical top part of the divider and a lower, generally flat member 31 secured to the member 30 by lateral flanges 32. The member 31 closes the divider 26 at the bottom and provides the divider with an under surface sloping upwardly in a forward direction. Divider members 33 are also connected to each shield 25 outside of the snapping rolls 22. Each divider member 33 is composed of an upper sheet metal member 34 of a section as shown in Figure 3 extending in conical formation to a point as seen in Figure 2. As seen in Figure 3, each divider member 33 is also provided with a lower flat member 35 having side flanges 36, by which the member 35 is secured to the member 34. The lower flat members 35 are like the member 31 in that they provide lower surfaces for the divider members 33 which slope upwardly in a forward direction.

Each divider member 33 is connected at its lower rear end to one of the shields 25 by a bolt 37, and at its upper rear end by a bolt 38 extending through an ear 39 secured to the upper part 34.

Figure 8 shows the operation of a picker with a different type of gather point and deflecting means in a field of corn in which is also planted soy beans, but the showing of this figure will suffice for description of the operation of the form shown in Figure 1. The soy beans in and around the corn stalks tend to become entangled with the snapping rolls and thereby interfere with the successful operation of the rolls. The lower parts 31 and 35 of the dividers 26 and 33, respectively, have under surfaces which slope upwardly in a forward direction. Thus, as the picker in Figure 1 is moved through a field of the type shown in Figure 8, the aforementioned under surfaces act to deflect downwardly the soy bean plants in the manner shown in Figure 8, so that these plants may not become entangled with the snapping rolls.

As previously stated, the upper ends of the central divider member 26 shown in Figure 4 is secured by the bolt 28 in any one of a number of holes 29. In this way there may be an adjustment of the divider member 26 and, consequently, of the under surface of the divider member provided by the member 31 to suit conditions. If the picker is used in a field that contains no extraneous plant growth such as soy beans, the bolt 28 may be removed, so that the divider member 26 is permitted to pivot with respect to the picker and to follow the contour of the ground with the lower member 31 in contact with the ground. Similarly, the divider members 33 may be permitted to pivot with respect to the picker. This is accomplished by removal of the bolt 38. The divider member 33 may, as shown in the dotted position of Figure 5, follow the ground with the under member 35 in contact with the ground.

From the foregoing description relating to Figures 1 and 8, it may be seen that the form of picker provided in Figure 1 has a divider construction of such a nature that, when connected in one way to the picker, it may ride the ground and thus act as dividers in the usual manner and, when connected in another way, may be elevated slightly from the ground so as to provide upwardly sloping under surfaces which act to deflect downwardly extraneous plant growths.

Figures 6, 7, and 8 show a modified form. This also includes a tractor similar to that of Figure 1, that is, one having a narrow body 11, narrow front wheel support 12, rear axle 13, and rear wheels 14. A harvester 15 is mounted upon the tractor in the way shown in the aforementioned copending applications. The harvester unit includes two units 20 at opposite sides of the tractor, each including a snapping unit 21 having snapping rolls 22. Positioned directly in front of the tractor body 10 is a member 40, which may be hollow and formed of sheet metal. As seen in Figure 7, the member 40 tapers very slightly in a forward direction toward the center and is provided with a blunt front end. The member is pivotally connected at its lower end by a pin 41 extending through the member and through sheet metal parts 42 forming part of the harvester at opposite sides of the front end of the tractor body 11. The upper end of the member 40 is connected by bolts 43 which extend through arcuate slots 44 in the parts 42. The slots 44 permit a slight pivoting of the member 40 with respect to the front of the harvester. The member 40 is provided with an under surface 45 which is convex and slopes upwardly in a forward direction. There are somewhat similar members 46 positioned outside of the snapping rolls 22 and pivotally connected to shields 47 by bolts 48. As in the case of the member 40, the members 46 have a limited pivotal movement with respect to the harvester 15, by virtue of a flange portion 49 which strikes the shield 47 thereby limiting the upward movement of the member 46, and also strikes a projection 50 formed on the shield 47 thereby limiting the downward movement. The members 46 are tapered slightly outwardly, as viewed in Figure 7, and are blunt at their forward ends. They are provided with under surfaces 51 similar to the under surface 45 on the member 40, which are convex and curve upwardly in a forward direction.

The operation of the machine shown in Figures 6 and 7 in a field of corn in which are also planted soy beans is as shown in Figure 8. The under surfaces 45 and 50 of the members 40 and 46 serve to deflect downwardly extraneous plant growth, such as soy beans, so as to prevent them from becoming entangled with the snapping rolls 22. The pivotal connection of the members 40 and 46 to the harvester gives a certain amount of flexibility to the members.

It will be apparent from the foregoing description relating to Figures 6, 7, and 8 that a second form of deflecting means for preventing extraneous plant growth from becoming entangled with the snapping rolls of a harvester has been provided. In this form the under surface of the deflecting means, which presses down extraneous plant growth, not only slopes upwardly in a forwardly direction but also is of a convex curvature so that the upward slope is progressively increasing. Furthermore, the deflecting means is pivotally connected to the harvester so that the slope of the under surface may change at any one point by virtue of the pivotal connection.

The invention has been illustrated for use with a corn picker including snapping rolls, and it has been stated that it is applicable to the pressing down of soy bean plants growing in a corn field. It will be obvious, of course, that the invention is also applicable to other types of harvesting mechanism harvesting other crops than corn in which other extraneous plants than soy beans are present. The intention is to limit the invention only within the scope of the appended claim.

What is claimed is:

In combination, a tractor, a harvester mounted thereon and including shield members and snapping units mounted at opposite sides of the tractor, pointed hollow shell members secured at two points to the shield members at the front of the tractor and having under surfaces sloping upwardly in a forward direction for pressing down extraneous plant growth at the sides of corn stalks from which ears are removed by the snapping units, one point of securement of each shell member to the shield members being adapted to be removed so as to leave each shell member pivotally connected by the other point of securement and thereby to ride the ground as a divider.

BENJAMIN M. HYMAN.